Figure 1:
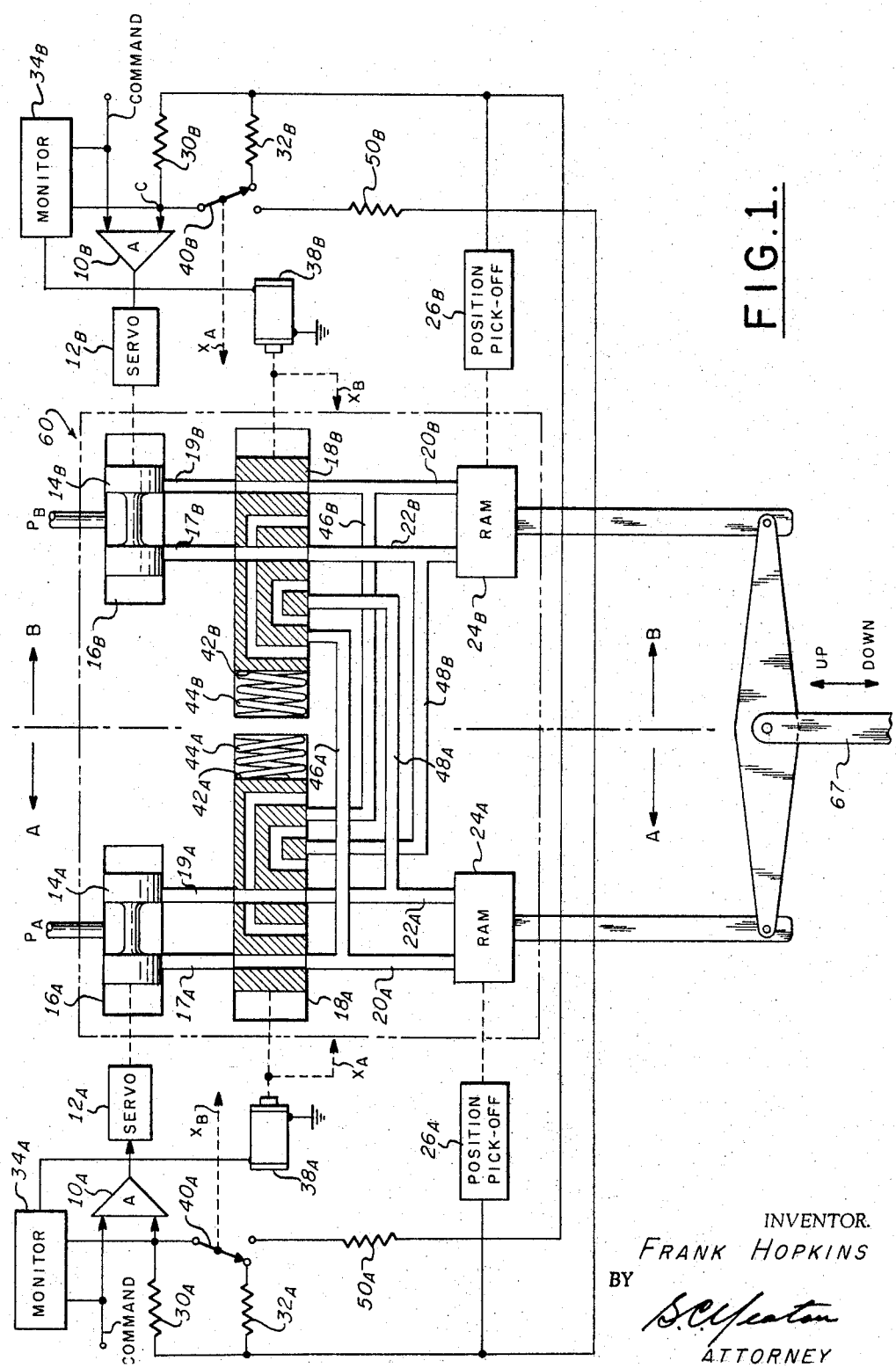

Aug. 30, 1966  F. HOPKINS  3,269,676
VALVE ACTUATOR APPARATUS
Filed April 30, 1965  3 Sheets-Sheet 1

INVENTOR.
FRANK HOPKINS
BY
S.C. Yeaton
ATTORNEY 3,269,676
Patented August 30, 1966

3,269,676
VALVE ACTUATOR APPARATUS
Frank Hopkins, Phoenix, Ariz., assignor to Sperry Rand Corporation, Great Neck, N.Y., a corporation of Delaware
Filed Apr. 30, 1965, Ser. No. 452,147
11 Claims. (Cl. 244—78)

This invention relates in general to apparatus for positively driving an output member, and in particular the invention involves actuator apparatus having redundant halves which so cooperate that the driven member is unaffected whether both or either of the halves is controlled to drive the member.

As background for the invention, consider the prior art of U.S. Patent 3,145,330, filed in the name of Herbert Hecht and assigned to the instant assignee. Redundant servo channels of an aircraft autopilot are there shown cooperating to drive opposing ends of an output differential bar linkage, and on failure of either servo channel, its respective driven end is returned to a neutral position by centering means, e.g. springs; thereafter the servo channel that is still operative controls the linkage. Aside from undesirably requiring means for centering the end of the bar linkage that is associated with the failed servo channel, such action by the prior art apparatus has the undesirable effect of halving the gain of the overall system, whereby the ability of the autopilot system to control the aircraft is greatly reduced.

In providing one form of the invention, use is made of the prior art redundancy practice of employing pairs of hydraulic control actuators in cooperation with respective hydraulic power actuators, which power actuators connect to drive opposing ends of a common output linkage. Rather than have the control actuators hydraulically coupled directly to their respective power actuators, however, the present invention employs switching actuators for each of the control-power actuator pairs, whereby each control valve is cross-coupled to drive, if need be, both power actuators. Hence, the need for positioning neutrally the linkage end associated with a failed servo channel is obviated, and since both power actuators always drive their common linkage, the gain of the system is never halved when one servo channel fails. (In fact, the gain of the overall control system loop doubles when both power actuators are held under closed-loop control, and for this reason means is provided with the apparatus of the invention for halving such "double gain" at the instant there is a failure in one of the servo channels, whereby the gain for the overall control system is kept constant.)

A principal object of the invention is to provide improved apparatus for positionably driving an output member.

Another object of the invention is to provide servo apparatus having redundant channels which drive an output member with the same force and effect whether one or both channels are coupled to drive the member.

Another object of the invention is to provide hydraulic actuator apparatus having redundant halves each of which has its own control actuator and power actuator, such apparatus including means for employing each control actuator to drive not only its respective power actuator, but also the power actuator associated with the other control actuator.

Figure 2:
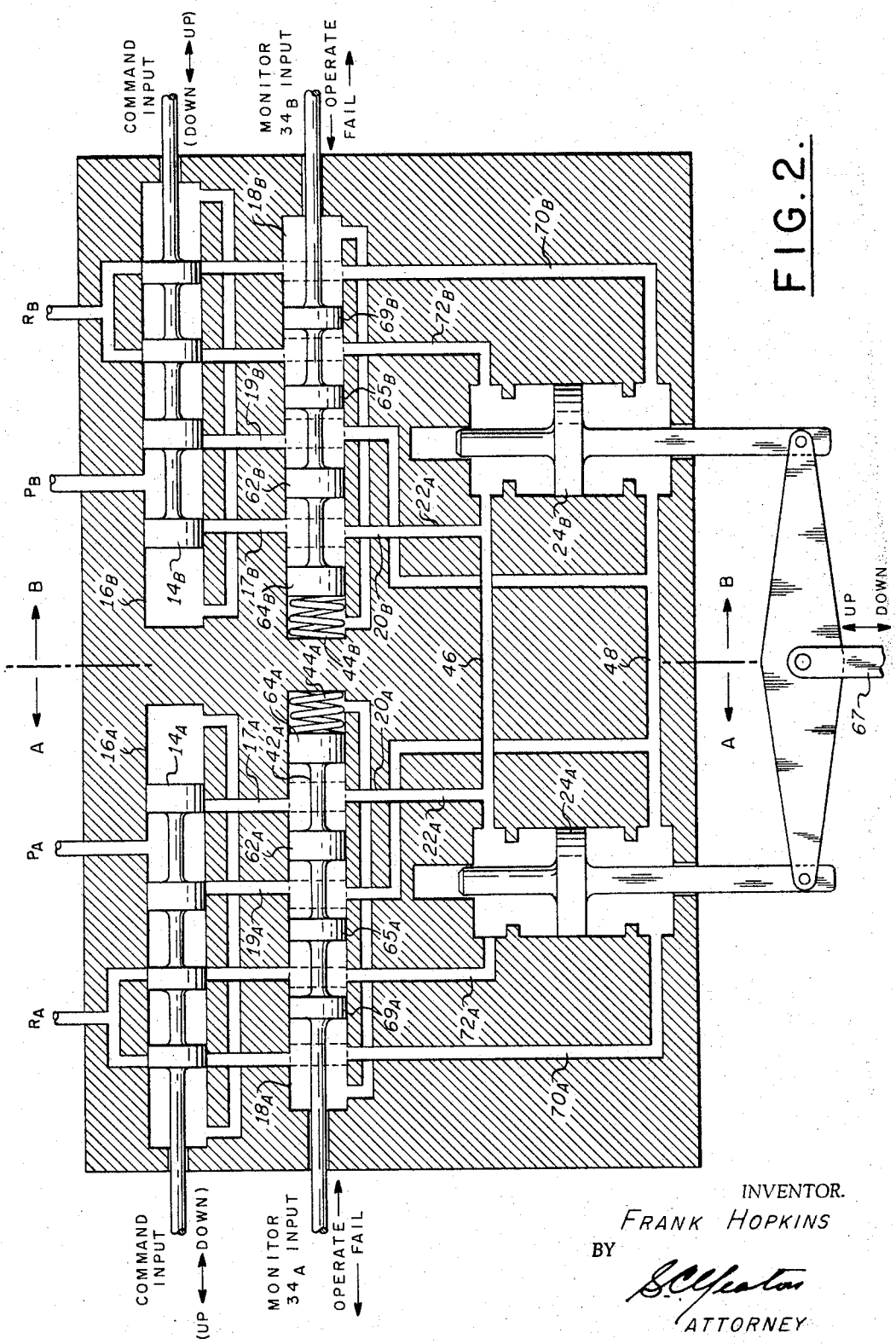
Figure 3:
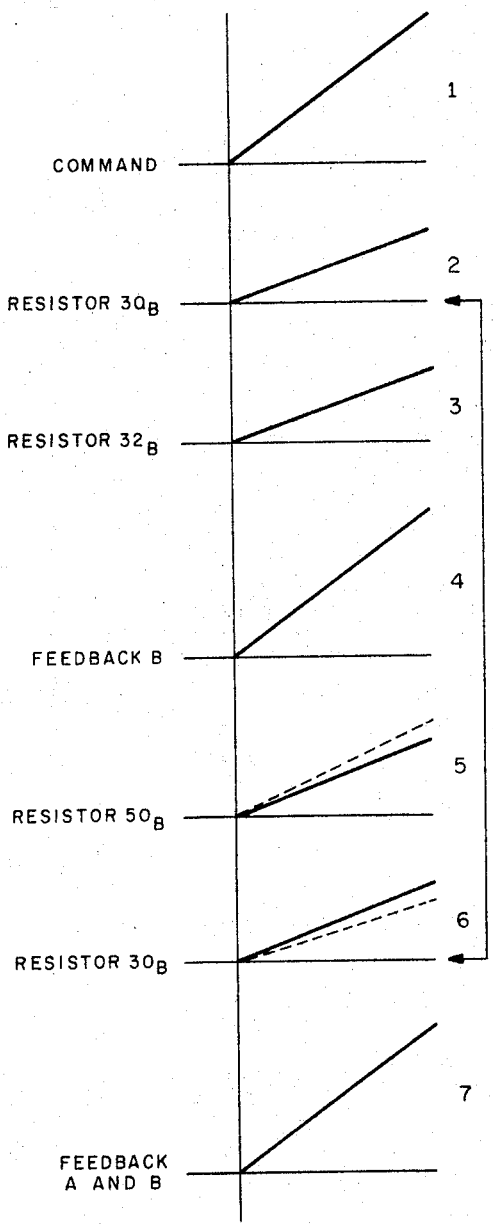

The invention will be described with reference to the figures wherein:

FIG. 1 is a schematic diagram showing a complete servo system employing apparatus embodying the invention, FIG. 2 depicts a form of actuator, embodying the invention, which may be employed in the system of FIG. 1, and FIG. 3 shows diagrams useful in explaining the feedback technique of the invention.

Referring to FIG. 1, two redundant servo channels designated respectively A and B of, for example, an autopilot receive respective command input signals either from the same or from redundant sensor components. Subscripts A and B throughout this description are hereafter employed to indicate equivalent elements of each of the redundant channels.

The command signals are applied to servo amplifiers $10_A$ and $10_B$, from whence they are applied to servomotors $12_A$ and $12_B$. The servomotors are mechanically linked respectively to drive the spools $14_A$ and $14_B$ of respective control actuator valves $16_A$ and $16_B$. Under normal operation, the control actuator valve $16_A$ receives hydraulic fluid under pressure via input conduit $P_A$ and applies same via coupling conduits $17_A$ and $19_A$, through a switching actuator valve $18_A$ (to be described later), to either of two input conduits $20_A$ and $22_A$ of a hydraulic ram power actuator $24_A$. Likewise, under normal operation, the control actuator valve $16_B$ receives hydraulic fluid under pressure via an input conduit $P_B$ and applies same via coupling conduits $17_B$ and $19_B$ through a switching actuator valve $18_B$, to either of two input conduits $20_B$ and $22_B$ of a hydraulic ram power actuator $24_B$. Return conduit lines for the hydraulic components of FIG. 1 are deliberately omitted for sake of clarity and ease of understanding.

Feedback signals representing the respective positions of the output rams of the power actuators $24_A$ and $24_B$ are derived respectively from pick-offs $26_A$ and $26_B$, which feedback signals are respectively applied to the servo amplifiers $10_A$ and $10_B$. The feedback signal applied to the amplifier $10_A$ is applied through parallel resistors $30_A$ and $32_A$; the feedback signal applied to the amplifier $10_B$ is applied through parallel resistors $30_B$ and $32_B$.

Servo monitor devices $34_A$ and $34_B$, which function to assure that the outputs of their respective servo channels follow their inputs (servo monitors are well-known as exemplified by U.S. Patents 2,823,877, 2,973,927, and 3,135,485), operate to energize respective relays $38_A$ and $38_B$ when their respective servo channels operate properly. Each of the relays ($38_A$ and $38_B$) when energized cross-operates a spring loaded switch (respectively $40_B$ and $40_A$) to connect respectively the resistors $32_B$ and $32_A$ to the amplifiers $10_B$ and $10_A$; in addition, the relays ($38_A$ and $38_B$) when energized respectively operate to position movable spool switching sections $42_A$ and $42_B$ (schematically shown for purposes of clarity) of the value actuators $18_A$ and $18_B$ against the tension of respective springs $44_A$ and $44_B$. With both relays $38_A$ and $38_B$ energized, as aforesaid, fluid may pass through the switching valves $18_A$ and $18_B$ to the power actuator input conduits $20_A$–$22_A$, and $20_B$–$22_B$; with both relays de-energized the power actuator input conduits $20_A$ and $22_A$ are isolated from their respective control actuator valve $16_A$, and the power actuator input conduits $20_B$ and $22_B$ are also isolated from their respective control actuator valve $16_B$. With one relay energized and one relay de-energized, fluid passes from the control valve actuator, through its related switching actuator and thence to both ram power actuators. For example, if the relay $38_A$ de-energizes in response to a servo-monitor $34_A$ indication of a failed channel, the spool $42_A$ of the switching actuator $18_A$ will re-position to prevent fluid from passing through the switching actuator via conduits $17_A$ and $19_A$; however, such re-positioning of the spool will work to cause fluid to pass (via cross coupling conduits $46_B$ and $48_B$) through the switching actuator $18_A$ to the ram power actuator $24_A$. Likewise, a de-energization of the relay $38_B$ will cause fluid to be blocked from passing via its conduits $17_B$ and $19_B$, but fluid will be free to flow to the ram valve actuator $24_B$ via the switching actuator $18_A$ and its cross coupling conduits ($46_A$ and $48_A$).

When one relay, say relay $38_A$, de-energizes, it removes part of the normal feedback from the ram actuator $24_B$ applied to the servo amplifier $10_B$ by switching out, by means of the switch $40_B$, the parallel feedback resistor $32_B$, and applies to the servo amplifier $10_B$ instead of the feedback signal from the ram actuator $24_A$ via a resistor $50_B$. De-energizing the relay $38_B$ does the same thing to the feedback signal applied to the servo amplifier $10_A$, only this time a resistor $50_A$ is used for the alternate feedback signal. Such arrangement for the feedback has the advantageous effect of keeping both ram actuators $24_A$ and $24_B$ always under closed loop control without ever appreciably causing the gain of the system to change, and will be described in more detail later.

FIG. 2 shows a practical form of the hydraulic circuit 60 of FIG. 1, similar character notations being employed on FIG. 2 for their identical counterparts on FIG. 1. To understand this hydraulic circuit best, consider that both redundant channels A and B are disengaged so that neither relay $38_A$ nor relay $38_B$ is energized by its respective monitor component. With such the case, the switch actuator spools $42_A$ and $42_B$ are positioned (as shown by dashed lines) by their respective springs $44_A$ and $44_B$ so that their respective lands ($62_A$–$64_A$ and $62_B$–$64_B$) block fluid from passing from their respective control valve actuators $16_A$ and $16_B$ to drive the ram actuators $24_A$ and $24_B$. Also, their lands $65_A$ and $69_A$, and $65_B$ and $69_B$ prevent fluid from leaving their respective ram actuators $24_A$ and $24_B$. Energizing the relays $38_A$ and $38_B$ by means of the respective monitors $34_A$ and $34_B$ causes the relays to position the switching actuator spools $42_A$ and $42_B$ as shown. A command input to the servo amplifiers $10_A$ and $10_B$, directing that the output member (67) be driven "down" (see FIG. 2), causes the servomotors $12_A$ and $12_B$ to drive their respective control valve spools $14_A$ and $14_B$ respectively to the right and left (looking at the spools as shown on FIG. 2). Now, fluid may pass from the input orifice $P_A$ through the control valve actuator $16_A$, through its output conduit $17_A$, and through the switching actuator $18_A$, to the ram actuator input conduit $20_A$ to drive the ram actuator $24_A$ "down"; likewise, fluid simultaneously flows from the input orifice $P_B$ through the control valve actuator $16_B$, through its output conduit $17_B$, and through the switching actuator $18_B$, to the ram actuator input conduit $20_B$ to drive the ram actuator $24_B$ "down." Fluid trapped on the "down side" of the ram actuators $24_A$ and $24_B$ during such operation is returned to its source ($R_A$ and $R_B$ respectively) via return conduits (respectively $70_A$ and $70_B$).

A commond input that dictates the output member (67) is to move "up" means that the channel A fluid path is via elements $P_A$, $16_A$, $19_A$, and $22_A$, with return to $R_A$ being via the conduit $72_A$; likewise, the channel B fluid path is via $P_B$, $16_B$, $19_B$ and $22_B$, with return to $R_B$ being via a conduit $72_B$. Since equipressure fluid appears in conduits $20_A$ and $20_B$, and equipressure fluid appears in conduits $22_A$ and $22_B$, fluid under normal operation does not flow in the cross-connecting conduits 46 and 48.

To understand how the present invention obviates the need for centering means for either of the ram valve actuators $24_A$ and $24_B$, consider for example what happens when the relay $38_A$ is de-energized because of a failure in the redundant servo channel A: The spool $42_A$ of the switching actuator $18_A$ returns to the position shown by its related dashed lines, thereby preventing fluid from being applied to the ram actuator $24_A$ via either the conduit $20_A$ or the conduit $22_A$; also fluid is prevented from being exhausted to the return $R_A$ via the conduits $70_A$ and $72_A$. Since fluid can neither leave nor enter the ram actuator $24_A$ via its own conduits, any fluid applied to the ram actuator $24_B$ via its conduit $20_B$ to drive the ram $24_B$, say, "down," also gets cross-applied via the conduit 46 to drive the ram $24_A$ "down," the cross-coupling conduit 48 being now employed to exhaust the fluid from the ram $24_A$ to the exhaust conduit $70_B$ of the ram actuator $24_B$. An "up" command, when the servo channel A has failed, causes the conduit 48, fluid exhausting therefrom being via the cross conduit 46 and the conduit $72_B$.

As stated above, the present invention always provides closed loop control over both ram actuators without introducing a system gain change when one servo channel has failed. To appreciate this fact consider FIG. 1 in relation to FIG. 3: Plot 1 of FIG. 3 shows a ramp input signal that may for example be applied to the servo amplifier $10_B$. Plots 2 and 3 show the feedback signal developed across the resistors $30_B$ and $32_B$ when the servo channel B properly operates, with the resultant sum feedback signal, as appears at the input (contact C) to the servo amplifier $10_B$ being depicted by plot 4. (Under normal operation, the channel A command, resistor $30_A$, resistor $32_A$ and sum feedback signal plots are identical with the plots 1 through 4.) Failure of the servo channel A, as above stated, removes the resistor $32_B$ and its related signal in the FIG. 1 circuit, and causes the signal derived from the servo channel A pick-off device $26_A$ to be applied to the channel B summing point contact (C) via the resistor $50_B$ (plot 5), whereby such signal together with the signal applied through the resistor $30_B$ (plot 6) produces a sum feedback signal (plot 7) for closed loop controlling both ram actuators in the same manner and with the same gain that only one ram actuator was controlled.

The dashed lines appearing on plots 5 and 6 show that even with the gains of the two channels different for one reason or another (e.g. channel B has higher gain than channel A) the system gain, as represented by the resultant positioning of the output member 67 in response to a given input command signal, always remains substantially constant, i.e. where one channel slacks off, the other takes up, and this is so whether or not any one channel fails.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for driving an output member in response to command signals comprising first and second power actuator means coupled to drive simultaneously the output member, first and second control actuator means responsive to said command signals for applying fluid under pressure to drive respectively said first and second power actuator means, means for coupling the fluid applied by said first control actuator means to drive both said power actuator means when said second control actuator means is unresponsive to the command signals, and means for coupling the fluid applied by said second control actuator means to drive both said power actuator means when said first control actuator means is unresponsive to the command signals.

2. Apparatus for driving an output member in response to command signals comprising first and second power actuator means coupled to drive simultaneously the output member, first and second control actuator means responsive to said command signals for applying fluid under pressure to drive respectively said first and second power actuator means, means for detecting when either of said control actuator means is unresponsive to the command signals, means responsive to said detecting means for coupling the fluid applied by said first control actuator means to both said power actuator means when said second control actuator means is unresponsive to the command signals, and means responsive to said detecting means for coupling the fluid applied by said second control actuator means to both said power actuator means when said first control actuator means is unresponsive to the command signals.

3. Actuator apparatus for use with first and second redundant servos comprising first and second control valve means adapted to be driven respectively by said servos, first and second power actuator means, and means for applying pressurized fluid from said first and second control valve means respectively to said first and second power actuator means when both servos function properly, for applying fluid from said first control valve means to both said power actuator means when said second servo malfunctions, and for applying fluid from said second control valve means to both said power actuator means when said first servo malfunctions.

4. Fluid responsive apparatus comprising:
(a) first control valve means having first and second output conduits and means for applying fluid to either of said conduits,
(b) first power actuator means having first and second input conduits for receiving said fluid respectively from said first and second output conduits of said first control valve means,
(c) second control valve means having third and fourth output conduits and means for applying fluid to either of those conduits,
(d) second power actuator means having third and fourth input conduits for receiving the fluid respectively from the third and fourth output conduits of said second control valve means,
(e) means for applying the fluid of said first and second output conduits to either the input conduits of one of said power actuator means or of both power actuator means, and
(f) means for applying the fluid of said third and fourth output conduits to either the input conduits of one of said power actuator means or of both said power actuator means.

5. Fluid responsive apparatus comprising:
(a) first control valve means having first and second output conduits and means for applying fluid to either of said conduits,
(b) first servo means for operating said means for applying fluid,
(c) first power actuator means having first and second input conduits for receiving said fluid respectively from said first and second output conduits of said first control valve means,
(d) second control valve means having third and fourth output conduits and means for applying fluid to either of those conduits,
(e) second servo means for operating said means of said second control valve means for applying fluid,
(f) second power actuator means having third and fourth input conduits for receiving the fluid respectively from the third and fourth output conduits of said second control valve means,
(g) means for applying the fluid of said first and second output conduits to the input conduits of said first power actuator means when said first servo means functions properly and to both power actuator means when said first servo means malfunctions, and
(h) means for applying the fluid of said third and fourth output conduits to the input conduits of said second power actuator means when said second servo means functions properly and to both said power actuator means when said second servo means malfunctions.

6. The apparatus of claim 5 including:
(a) first and second pick-off means for producing first and second signals representing respectively the reactions of said first and second power actuator means in response to applied fluid,
(b) means for applying the first signal as feedback to said first servo means when said second control valve applies fluid to said second power actuator means and for applying said first signal as feedback to said second servo means when said second control valve applies fluid to both said power actuator means, and
(c) means for applying the second signal as feedback to said second servo means when said first control valve applies fluid to only said first power actuator means and for applying said second signal as feedback to said first servo means when said first control valve applies fluid to both power actuator means.

7. The apparatus of claim 6 including means for decreasing the feedback from said first pick-off means when the signal from said second pick-off means is applied to said first servo means, and means for decreasing the feedback from said second pick-off means when the signal from said first pick-off means is applied to said second servo means.

8. Autopilot apparatus for aircraft comprising means for driving a control surface on said craft, means for producing attitude command signals, first and second servo channels responsive to the command signals, valve apparatus having respective redundant first and second halves each of which is responsive to the output of a respective one of said servo channels to operate said means for driving a control surface, said valve apparatus halves having respectively first and second control and first and second power actuator portions, and means for enabling either control actuator portion to cooperate with one or both of said power actuator portions.

9. Autopilot apparatus for aircraft comprising means for driving a control surface on said craft, means for producing attitude commanad signals, first and second servo channels responsive to the command signals, valve apparatus having respective redundant first and second halves each of which is responsive to the output of a respective one of said servo channels to operate said means for driving a control surface, said valve apparatus halves having respectively first and second control and first and second power actuator portions, means responsive to failure in said first servo channel for making the second control actuator portion cooperate with both said power actuator portions, and means responsive to failure in said second servo channel for making the first control actuator portion cooperate with both said power actuator portions.

10. Autopilot apparatus for aircraft comprising means for driving a control surface on said craft, means for producing attitude command signals, first and second servo channels responsive to the command signals, valve apparatus having respective redundant first and second halves each of which is responsive to the output of a respective one of said servo channels to operate means for driving a control surface, said valve apparatus halves having respectively first and second control and first and second power actuator portions, means responsive to failure in said first servo channel for making the second control actuator portion cooperate with both said power actuator portions, first and second pick-off means respectively for said first and second power actuator portions for providing respectively first and second servo feedback signals, means for applying the first feedback signal to said first servo channel when that channel properly operates and for applying said first feedback signal to said second servo channel when the first servo channel does not operate properly, and means for applying the second feedback signal to said second servo channel when that channel operates properly and for applying said second feedback signal to said first servo channel when the second servo channel does not operate properly.

11. The apparatus of claim 10 including means for decreasing the magnitude of the first feedback signal when the second feedback signal is applied to the first servo channel, and means for decreasing the magnitude of the second feedback signal when the first feedback signal is applied to the second servo channel.

No references cited.

MILTON BUCHLER, *Primary Examiner*.

A. H. FARRELL, *Assistant Examiner*.